Figure 4:
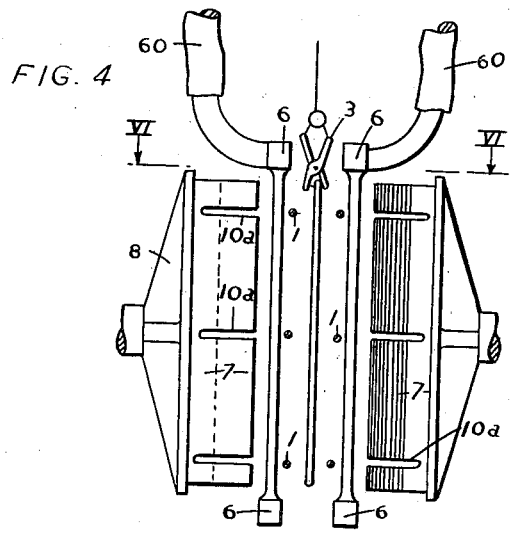

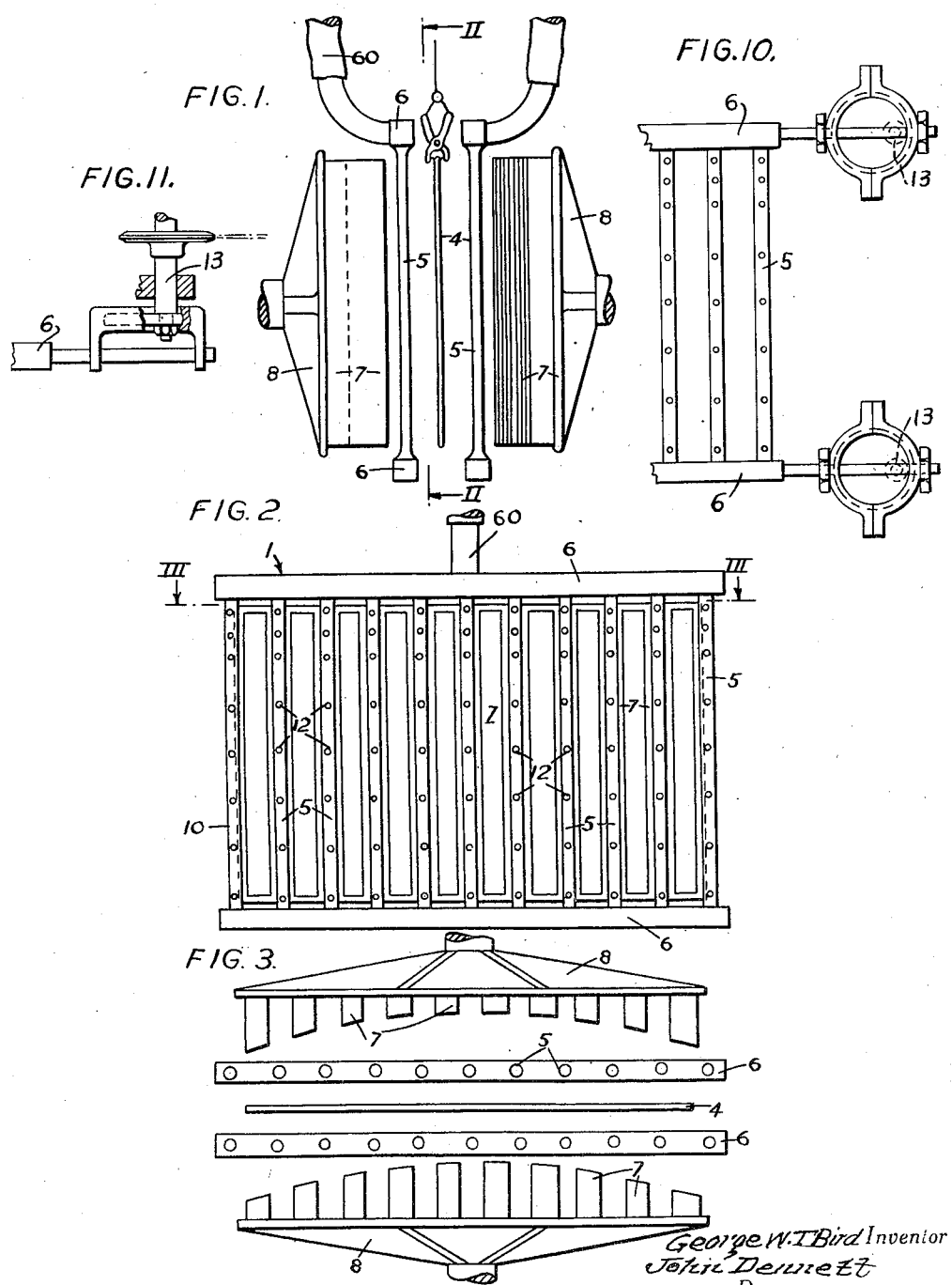

Jan. 2, 1951 G. W. T. BIRD ET AL 2,536,905
APPARATUS FOR BENDING AND TEMPERING SHEETS OF GLASS
Filed March 2, 1948 3 Sheets-Sheet 3
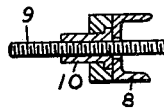
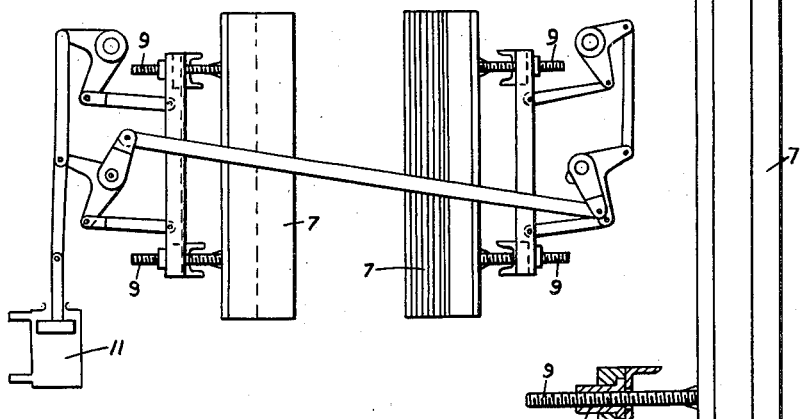
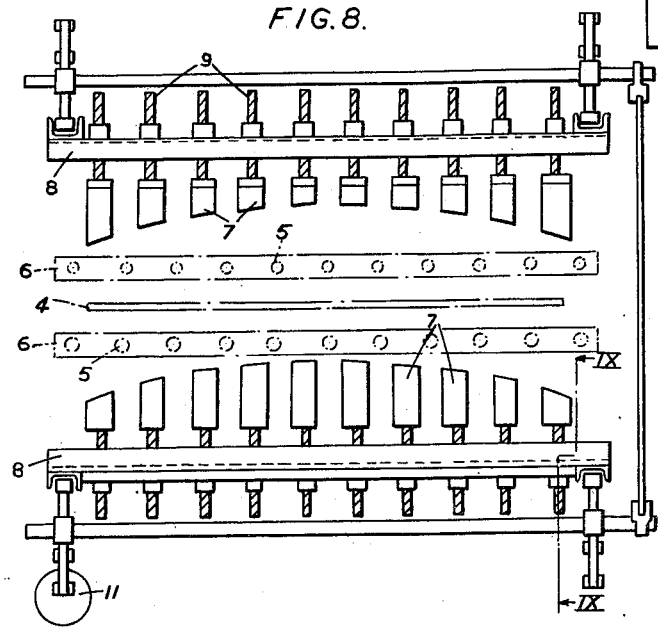
Inventor
George W. T. Bird
John Dennett
By
Attorney Patented Jan. 2, 1951

2,536,905

UNITED STATES PATENT OFFICE 2,536,905

APPARATUS FOR BENDING AND TEMPERING SHEETS OF GLASS

George William Terence Bird and John Dennett, St. Helens, England

Application March 2, 1948, Serial No. 12,498
In Great Britain July 22, 1946

10 Claims. (Cl. 49—1)

This invention relates to the art of bending and tempering sheets of glass.

In the usual practice of tempering flat sheet glass, a sheet is heated up to near its softening temperature, bent as desired by two mutually movable sets of shaping bars and then raised between two jet cooling grids which form a tempering station. The opposed jets from the grids rapidly quench the surfaces of the glass sheet which is thereby tempered or toughened in a state of strain. To reduce heat losses in the glass which occur during raising the bent glass to the tempering means it has been proposed to construct the tempering means so that they can be lowered to the glass immediately the forming operation is completed in such case the glass is bent and tempered at a common station.

The main object of the present invention is to improve the tempering or toughening of bent or curved sheets of glass, and the accuracy of the configuration of the product, and a further object is to devise apparatus which is readily adaptable for producing tempered sheets of different curved forms.

Apparatus for bending and tempering a sheet of glass which has been heated up to near its softening temperature according to the present invention, is characterized by the combination with two sets of shaping means mutually movable to shape a sheet of glass disposed between them for bending and to be withdrawn from the sheet after bending it, of opposed sets of jet forming means operatively associated with the shaping means and disposed to project quenching jets on to the bent glass immediately following the withdrawal of the shaping means from the glass, which remains in the position which it occupies during bending.

The invention also comprises apparatus for bending and tempering a sheet of glass which has been heated up to near its softening temperature, characterized by the combination with two sets of shaping means mutually movable to shape a sheet of glass disposed between them for bending and to be withdrawn from the sheet after bending it, of opposed sets of jet forming means spaced apart to accommodate between them a bent sheet, the extent of withdrawal of the shaping means being such as to move them out of the paths of the quenching jets, so that the jets may be projected onto the glass immediately after bending, the glass remaining in the position which it occupied during bending.

The shaping means may comprise shaping elements in the form of bars which may be of wood or faced with wood, plaster or asbestos, or the elements may be constituted by pads or blocks so that instead of the sheet being linearly engaged it is engaged at intervals along a line in a bending operation.

By providing apparatus for bending a sheet of hot glass when disposed in position midway between the opposed sets of jets forming means, the present invention enables the quenching to be effected on glass at a higher temperature than if the glass had to be moved from the bending station to a tempering station, during which operation a loss of heat is continuing, accordingly a higher degree of toughening can be obtained than has hitherto been found possible, moreover the transmission of a suspended sheet of glass from a bending to a higher quenching station involves a tug on the already cooling glass which in view of its inability to deform to the tongs produces tong vents. Moreover, as there is no loss of heat due to lapse of time in transporting the glass from the bending to a tempering station, the temperature of the glass on leaving the furnace may be lower than heretofore thereby reducing the amount of sag at the tong points.

The tempering means may be comprised by opposed air boxes, the opposed faces being apertured to provide several rows of jet forming means, and the opposed faces provided with channels between the rows deep enough to receive a set of shaping elements so that they are out of the paths of the jets. To this end the opposed faces of the air boxes may be corrugated, the rows of apertures being formed on the crests of the corrugations and the shaping elements disposable in furrows between the crests.

Alternatively the rows of apertures may be formed in local swellings on the opposed faces so that the elements when in withdrawn or retracted position, lie against flat portions of the air boxes left between the swellings. In such arrangements the elements may be disposed in lines parallel to, or at right-angles to rows of jet forming apertures.

In such arrangements the shaping elements may be connected to a frame member disposed at right-angles to the lines of the elements, the frame members in turn being connected to actuating means, for example, a piston rod of which the piston is hydraulically operated or actuated by compressed air, or a rod which by suitable linkage and levers is power operated or actuated by hand.

A similar arrangement may be employed if the tempering means comprises two opposed series of spaced pipes suitably apertured to provide jet forming means, each series being mounted on a backing plate. Accordingly bending and toughening apparatus constructed according to the present invention may include two sets of shaping means mounted to be movable to and from a glass sheet disposed between them for bending in planes perpendicular to the sheet, and the tempering means comprises two opposed series of spaced pipes each pipe being provided with at least one row of jet forming means.

In some constructions, however, according to the invention the tempering means is oscillated or reciprocated to assure that the jets sweep the whole of the surfaces of the bent sheet being tempered, and in such constructions the tempering means comprises two opposed series of spaced pipes, each series forming a grid, each pipe being provided with at least one row of jet forming means, characterized by the shaping means of the two sets being mounted to be movable to a glass sheet, disposed between them for bending, from positions outside the respective grids to the said glass sheet and back from the sheet through the grids to pristine position whereby the grids may be freely and rapidly actuated to move the rows of jets and quench the whole area of a bent sheet disposed between them.

The grids, however, may be mounted on actuating means which can impart to the grids a circuitous or reciprocating motion in planes parallel to a sheet in the said midway position whereby on the shaping means being retracted through the respective grids following a bending operation the tempering jets which issue from the grids may be immediately moved in the circuitous or reciprocating paths prescribed by the actuating means for the grids. The motion may be of small amplitude i. e. small in relation to the area of glass being treated.

In some constructions according to the present invention the shaping elements of each set of shaping means are mounted to be individually adjustable in a perpendicular direction to the plane of the unbent sheet.

The shaping elements are preferably each mounted on threaded rods carried in threaded bearings on a laterally displaceable framework whereby individual adjustment of the elements is achieved by relative rotation between the respective rods and their bearings, and the elements thereby adapted to effect bending to various curvatures, and moreover to accurately adjust the elements to effect the production of a particular curvature.

The present invention is applicable to bending and toughening apparatus whether the glass is moved in a horizontal or a vertical direction after leaving the furnace, the glass being vertically disposed during the processes of heating, bending and toughening, and the invention comprises the combination with a furnace for heating glass in sheet form, two opposed series of spaced pipes, each series formed in a grid, and each pipe provided with at least one row of jet forming means, the series being disposed in planes near to the mouth of the furnace, means for withdrawing a sheet of glass and suspending it midway between the opposed grids, two sets of opposed shaping elements, each element being preferable laterally adjustable, and each set of elements being mounted and dimensioned to be advanced between the pipes of the respective grid from a position outside to the suspended glass sheet and withdrawn therethrough whereby the hot sheet suspended between the grids may be first bent and then tempered without actuating the suspending means.

Such apparatus may be characterized by the combination with a valve for controlling the supply of a fluid cooling medium to the pipes, of actuating means therefor carried by one or both of the sets of elements of means for actuating said elements whereby, on withdrawing the elements, the valve is actuated to admit the cooling medium, means for imparting a circuitous motion in planes parallel to the planes of the grids, and operative means for closing the valve, associated with the means for activating the grids whereby on stopping the grids the supply of cooling medium is cut off.

In order that the invention may be more clearly understood, one preferred embodiment as applied to a vertical form of furnace and comprising shaping means constituted by bars will now be described by way of example with reference to the accompanying drawings in which:

Figure 1 is an end view of a pair of sets of formers and a pair of quenching grids with the glass in position ready for bending.

Figure 5:
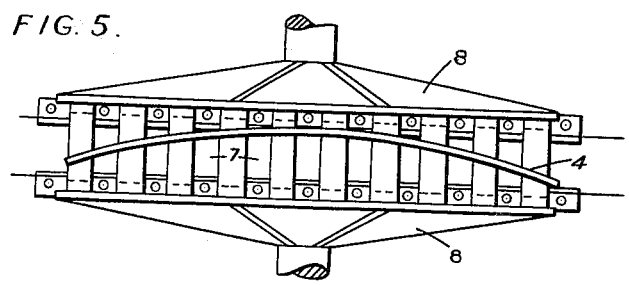
Figure 6:
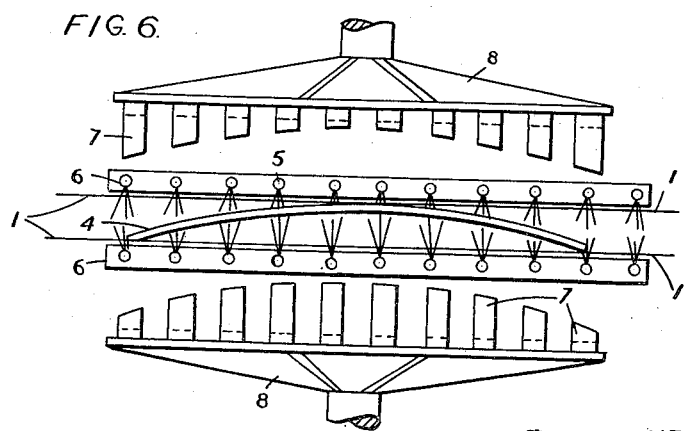

Figure 2 is a view looking in the direction of the arrows II—II of Figure 1 and showing one quenching grid and one set of formers, Figure 3 is a sectional plan view taken on the line III—III of Figure 2, Figure 4 is a view similar to Figure 1 showing three pairs of guide wires for steadying the glass, Figure 5 is a view showing the formers moved to the positions for bending the glass sheet, Figure 6 is a sectional plan taken on the line VI—VI of Figure 4 showing the positions of the parts when the quenching jets are projected on to the glass sheets immediately following the withdrawal of the shaping means from the glass, Figure 7 is an end view of a modified construction of shaping means and illustrating one arrangement of actuating means therefor, Figure 8 is a plan of the construction shown in Figure 7, the grids and an interposed sheet of glass being shown in chain lines, and Figure 9 is an elevation on the line IX—IX of Figure 8 to an enlarged scale showing details of the construction shown in Figures 7 and 8, hereafter referred to.

Figure 10 shows diagrammatically a part of a quenching grid with means for effecting circuitous movement thereof. Figure 11 is a plan of Figure 10.

An electrical furnace for heating a sheet of glass arranged beneath floor level, has the mouth covered by hinged flaps, and in alignment with and above the furnace is a tempering apparatus comprising two sets of vertically disposed pipes 5 each set being connected by horizontally disposed headers or manifolds indicated at 6, adapted to be supplied with compressed air through suitable conduits 60, the sets being disposed symmetrically of the central vertical plane of the apparatus so that a heated sheet 4 can be raised from the furnace into a said position between the tempering grids formed by the two sets of connected pipes. The pipes 5 may be rigidly connected to the headers or connected thereto by flexible tubes as will be well understood in the art.

Disposed outside each grid is mounted a set of shaping bars 7 mounted on a frame 8 mounted to be moved towards the respective tempering grids, so that the bars 7 can pass between the pipes 5 of the grid and engage and bend a heated sheet of glass 4 suspended between the grids and then moved back to withdraw the bars to pristine positions outside the grids, thereon tempering can be effected immediately after bending without moving the glass.

Any suitable steadying means such as the steadying wires 1 shown in Figures 4, 5 and 6 may be arranged to hold the glass steady during the quenching operation. The wires 1 shown in Figures 4, 5 and 6 may be carried on tensioning frames which may be adjustable towards the central plane of the apparatus so as to touch the glass. The bars 7 are formed with grooves 10a as shown in Figure 4 to enable the bars to pass the wires 1 when bending the glass.

In the construction shown in Figures 7 and 8, the bars 7 are mounted on iron rods 9 which are threaded, and the threaded parts pass through threaded bearings 10 each held against axial displacement but capable of rotation to enforce axial displacement of the rods 9. The bars 7 of each set can thus be adjusted to each other, and one set made to correspond with the other to enforce a particular bend on a heated glass sheet disposed between the tempering grids.

The frames 8 that carry the bars 7 may be mounted on shoes which run on rails (not shown in the drawings) and the frames may be actuated through a suitable linkage (Figures 7 and 8) by a piston working in a cylinder 11 and actuated by compressed air derived from the same source as that by which the tempering means are supplied, and the valve opening the tempering means to supply, may be operated from the respective frame or piston rod.

As shown diagramatically in Figures 10 and 11 tempering grids may be eccentrically connected to rotatable members 13 so as to receive a circuitous movement therefrom and thereby any part of each tube 5 moves through a circular path of a radius comparable with the spacing at the jet forming means which are provided on the tubes and may be constituted by a row of holes 12 thereon, the spacing of which may be between 1½ and 3 inches thereby a circular motion of small amplitude is obtained. As will be well understood in the art a time switch may be provided to regulate the period of tempering and to cut off supply of compressed air and the rotatable members 13 actuating the grids may be connected to a source of power, e. g. by switch means, operated from the forming bars or their actuating piston rods.

By employing constructions according to the invention in which adjustable shaping elements are provided, (for instance as shown in Figures 7 and 9) an accurately formed shape is produced in the bending operation and maintained during tempering as no external deforming stresses are applied since the bent sheet remains in the position at which bending occurred for the tempering operation.

In the operation of the apparatus shown in the drawings, the glass sheet is first heated in the furnace and is then withdrawn from the furnace and suspended in the space between the tempering means 5 and bending means 7 as illustrated in Figures 1 and 3. The frames 8 are then moved towards one another so that the shaping elements 7 pass through the grids formed by the pipes 5 and bend the glass to the required shape as illustrated in Figure 5. The plates 8 are then immediately moved away from one another, so that the shaping elements 7 are withdrawn through the grids as shown in Figure 6, whereupon cooling air is supplied to the grids through the conduits 60 so that quenching jets are projected from the apertures 12 on to the bent glass immediately following the withdrawal of the shaping elements 7, the bent glass remaining in the position shown in Figure 6.

We claim:

1. Apparatus for bending and tempering a sheet of glass which has been heated up to near its softening temperature characterized by the combination with two sets of shaping means mutually movable to shape a sheet of glass disposed between them for bending and to be withdrawn from the sheet after bending it, each of said sets of shaping means including a plurality of shaping elements spaced apart in the direction in which the sheet is to be bent, of opposed sets of jet forming means mounted in fixed spaced relation to be in operative position with respect to the sheet during bending and tempering thereof and thereby disposed to project quenching jets on to the bent glass immediately following the withdrawal of the shaping means from the glass, which remains in the position which it occupied during bending, said shaping elements passing between the jet forming means when being advanced to and withdrawn from engagement with the glass sheet.

2. Apparatus for bending and tempering a sheet of glass which has been heated up to near its softening temperature characterized by the combination with two sets of shaping means mutually movable to shape a sheet of glass disposed between them for bending and to be withdrawn from the sheet after bending it, each of said sets of shaping means including a plurality of shaping elements spaced apart in the direction in which the sheet is to be bent, of opposed sets of jet forming means mounted in fixed spaced relation and spaced apart to accommodate between them a bent sheet, said shaping elements passing between the jet forming means when being advanced to and withdrawn from engagement with the glass sheet, the extent of withdrawal of the shaping elements being such as to move them out of the paths of the quenching jets, so that the jets may be projected on to the glass immediately after bending, the glass remaining in the position which it occupied during bending.

3. Apparatus for bending and tempering a sheet of glass which has been heated up to near its softening temperature comprising in combination, two opposed series of spaced pipes, mounted in fixed spaced relation each series formed on a grid, and each pipe provided with at least one row of jet forming means, suspending a sheet of glass midway between the opposed grids, two sets of opposed shaping elements each set of elements being mounted and dimensioned to be advanced between the pipes of the respective grid from a position outside to the suspended glass sheet and withdrawn therethrough whereby the hot sheet suspended between the grids may be first bent and then tempered without actuating the suspending means.

4. Apparatus for bending and tempering a sheet of glass which has been heated up to near its softening temperature, comprising in combination two opposed series of spaced pipes mounted in fixed spaced relation, two sets of shaping means mounted for movement between said pipes to and from a glass sheet disposed between them for bending in planes perpendicular to the sheet, and at least one row of jet forming means for each pipe to project quenching jets onto the bent glass immediately following withdrawal of the shaping means from the glass which remains in the position it occupied during bending.

5. Apparatus for bending and tempering a sheet of glass which has been heated up to near its softening temperature, comprising in combination two opposed series of spaced pipes mounted in fixed spaced relation to receive at a mid-position therebetween a sheet of glass to be bent, at least one row of jet forming means for each pipe, each of said series of spaced pipes forming a grid movable freely and rapidly to move the rows of jets and quench the whole area of a bent sheet disposed between them, and two sets of shaping means mounted for movement in opposite directions through said grids to bend a sheet disposed between the grids, said jets being operative to project quenching jets on to the bent glass immediately following withdrawal of the shaping means from the glass.

6. Apparatus for bending and tempering a sheet of glass which has been heated up to near its softening temperature, comprising in combination two opposed series of spaced pipes mounted in fixed spaced relation to receive at a mid-position therebetween a sheet of glass to be bent, at least one row of jet forming means for each pipe, each of said series of spaced pipes forming a grid movable in planes parallel to a sheet in said mid-position between the grids to move the rows of jets and quench the whole area of a bent sheet, and two sets of shaping means mounted for movement in opposite directions through said grids to bend a sheet disposed between the grids, said jets being operative to project quenching jets on to the bent glass immediately following withdrawal of the shaping means from the glass.

7. Apparatus for bending and tempering a sheet of glass which has been heated to near its softening temperature, comprising in combination two sets of shaping means mutually movable to shape a sheet of glass disposed between them for bending and to be withdrawn from the sheet after bending it, each of said sets of shaping means including a plurality of individually settable shaping elements spaced apart in the direction in which the sheet is to be bent, and opposed sets of jet forming means mounted in fixed spaced relation to be in operative position with respect to the sheet during bending and tempering thereof and disposed to project quenching jets on the bent glass immediately following the withdrawal of the shaping means from the glass which remains in the position it occupied during bending, said shaping elements passing between the jet forming means when being advanced to and withdrawn from engagement with the glass sheet.

8. Apparatus for bending and tempering a sheet of glass which has been heated up to near its softening temperature, comprising in combination two opposed series of spaced pipes mounted in fixed spaced relation, two sets of shaping means mounted for movement between said pipes to and from a glass sheet disposed between them for bending in places perpendicular to the sheet, each said set including shaping elements mounted for individual adjustment in a direction perpendicular to the plane of the unbent sheet, and at least one row of jet forming means for each pipe to project quenching jets on to the bent glass immediately following withdrawal of the shaping means from the glass which remains in the position it occupied during bending.

9. Apparatus for bending and tempering a sheet of glass which has been heated up to near its softening temperature, comprising in combination two opposed series of spaced pipes mounted in fixed spaced relation, two sets of shaping means mounted for movement between said pipes to and from a glass sheet disposed between them for bending in planes perpendicular to the sheet, each said set including a laterally displaceable framework to support the individual shaping means of the set, a threaded bearing in the framework for each said shaping means, and a threaded rod for each said shaping means, the rods being carried in said threaded bearings to permit individual adjustment of the shaping means by relative rotation between the rods and their bearings in a direction perpendicular to the plane of the unbent sheet, and at least one row of jet forming means for each pipe to project quenching jets on to the bent glass immediately following withdrawal of the shaping means from the glass which remains in the position it occupied during bending.

10. Apparatus for bending and tempering a sheet of glass which has been heated up to near its softening temperature, comprising in combination two opposed series of spaced pipes mounted in fixed spaced relation to receive at a mid-position therebetween a sheet of glass to be bent, at least one row of jet forming means for each pipe, each of said series of spaced pipes forming a grid movable freely and rapidly to move the rows of jets and quench the whole area of a bent sheet disposed between them, and two sets of shaping means mounted for movement in opposite directions through said grids to bend a sheet disposed between the grids in planes perpendicular to the sheet, each said set including a laterally displaceable framework to support the individual shaping means of the set, a threaded bearing in the framework for each said shaping means, and a threaded rod for each said means, the rods being carried in said threaded bearings to permit individual adjustment of the shaping means by relative rotation between the rods and their bearings in a direction perpendicular to the plane of the unbent sheet.

GEORGE WILLIAM TERENCE BIRD.
JOHN DENNETT.

REFERENCES CITED

The following references are of record in the file of this patent:

UNITED STATES PATENTS

| Number | Name | Date |
|---|---|---|
| 1,960,222 | Long | May 22, 1934 |
| 2,111,370 | Owen | Mar. 15, 1938 |
| 2,137,061 | Quentin | Nov. 15, 1938 |
| 2,235,969 | White | Mar. 25, 1941 |
| 2,251,159 | Owen | July 29, 1941 |
| 2,369,368 | Paddock et al. | Feb. 13, 1945 |
| 2,372,418 | Forbes et al. | Mar. 27, 1945 |